(12) United States Patent  (10) Patent No.: US 8,762,228 B2
Slaney et al.  (45) Date of Patent: Jun. 24, 2014

(54) RECOMMENDATIONS BASED ON AN ADOPTION CURVE

(75) Inventors: Malcolm Slaney, Sunnyvale, CA (US); Eric Gottschalk, Carlsbad, CA (US); Todd M. Beaupre, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 74 days.

(21) Appl. No.: 13/278,609

(22) Filed: Oct. 21, 2011

(65) Prior Publication Data

US 2013/0103535 A1  Apr. 25, 2013

Related U.S. Application Data

(63) Continuation of application No. 11/869,486, filed on Oct. 9, 2007, now Pat. No. 8,050,960.

(51) Int. Cl.
*G06Q 30/00* (2012.01)

(52) U.S. Cl.
USPC ....... 705/26.7; 705/1.1; 705/26.1; 705/26.61; 705/51; 705/52; 705/53

(58) Field of Classification Search
USPC ............ 705/1.1, 26.1, 26.7, 26.61, 51, 52, 53
See application file for complete search history.

(56) References Cited

U.S. PATENT DOCUMENTS

| | | | |
|---|---|---|---|
| 8,401,924 B1 * | 3/2013 | Rajyaguru et al. | 705/26.61 |
| 8,434,024 B2 * | 4/2013 | Curtis | 715/811 |
| 2009/0326970 A1 * | 12/2009 | Estrada et al. | 705/1 |

* cited by examiner

*Primary Examiner* — Yogesh C Garg
(74) *Attorney, Agent, or Firm* — James J. DeCarlo; Greenberg Traurig, LLP (57) ABSTRACT

Methods and apparatus, including computer program products, for recommendations based on adoption curve. A method includes tracking over a period of time user popularity of a media content using a web service residing in a server, the popularity and period of time representing a life cycle of each of the media content. The method tracks over the period of time users enrolled in the web service and when in the period of time each of the users adopted the tracked media content and associates adopted media content with user profiles representing the users. The method recommends media content associated with a first user who adopted the tracked media content earlier in the period of time to a second user who may want to adopt the tracked media content subsequently in the period of time.

6 Claims, 6 Drawing Sheets

```
┌─────────────────────────────────────────────────┐
│ Track over a period of time user popularity of  │
│ media content using a web service residing in   │
│ a server.                                       │
│                      102                        │
└─────────────────────────────────────────────────┘
                         │
                         ▼
┌─────────────────────────────────────────────────┐
│ Track over the period of time users enrolled in │
│ the web service and when in the period of time  │
│ each of the users adopted the tracked media     │
│ content.                                        │
│                      104                        │
└─────────────────────────────────────────────────┘
                         │
                         ▼
┌─────────────────────────────────────────────────┐
│ Associate adopted media content with user       │
│ profiles representing the users.                │
│                      106                        │
└─────────────────────────────────────────────────┘
                         │
                         ▼
┌─────────────────────────────────────────────────┐
│ Recommend media content associated with a first │
│ user who adopted the tracked media content      │
│ earlier in the period of time to a second user  │
│ who may want to adopt the tracked media content │
│ subsequently in the period of time.             │
│                      108                        │
└─────────────────────────────────────────────────┘
```

RECOMMENDATIONS BASED ON AN ADOPTION CURVE

CROSS REFERENCE TO RELATED APPLICATIONS

This application is a continuation of, and claims priority from U.S. patent application Ser. No. 11/869,486, filed on Oct. 9, 2007 now U.S. Pat. No. 8,050,960, entitled RECOMMENDATIONS BASED ON AN ADOPTION CURVE, which is incorporated herein by reference.

BACKGROUND

The present disclosure relates to data processing by digital computer, and more particularly to recommendations based on an adoption curve.

The task of a conventional content-recommendation service is to recommend content or services to a user. In one example, a recommendation engine provided by a web-based music vendor may recommend certain songs to customers. Two classes of static recommendation systems that have been used for such purposes are attribute-based recommendation systems and collaborative-filtering based recommendation systems.

SUMMARY

The present invention provides methods and apparatus, including computer program products, for recommendations based on an adoption curve.

In general, in one aspect, the invention features a method including tracking over a period of time user popularity of a media content using a web service residing in a server, the popularity and period of time representing a life cycle of each of the media content and tracking over the period of time users enrolled in the web service and when in the period of time each of the users adopted the tracked media content. The method associates adopted media content with user profiles representing the users, and recommends media content associated with a first user who adopted the tracked media content earlier in the period of time to a second user who might want to adopt the tracked media content subsequently in the period of time.

In embodiments, tracking over the period of time user popularity of the media content can include tracking a number of downloads by users at any given time within the period of time, tracking a number of page views by users at any given time within the period of time, and/or tracking a length of time listened to or viewed by users at any given time within the period of time.

In embodiments, associating adopted media content with user profiles representing the users can include identifying genres of the user's adopted media content, and storing the adopted media content and the identified media content in the user's web service profile.

Each of the user profiles can include a user-selectable preference indicator. The indicator can represent or indicate how adventurous the user is feeling with respect to being exposed to new content.

In embodiments, recommending media content can include matching media content of a genre associated with the first user with media content of the genre associated with the second user, and recommending matched media content of the genre associated with the first user to the second user.

Tracking can include measuring a mean and a variance of a histogram of song plays, fitting the histogram to a Gaussian curve, and re-labeling a time axis of the histogram to normalize. The mean of the Gaussian curve can become time 0, plus one and minus one standard deviations labeled as plus one and minus one. A user who is a very early adopter will have a mean play time that is significantly less than zero and a user that is a very late adopter will have a mean play time that is much higher than one.

In another aspect, the invention features a method including tracking over a period of time user popularity of a media content using a web service residing in a server, the popularity and period of time representing a life cycle of each of the media content. The method tracks the media content that users engage over time and catalogs the engaged content into user portfolios of content, along with other information. The method measures differences in value of the media content in the portfolios of users at a first point in time and at a subsequent point in time and positions users relative to each on a curve depending on value changes in their portfolios between the first point in time and the subsequent point in time. The method recommends media content of a first user to a second user, the first person positioned ahead of the second user on the curve.

In embodiments, tracking over the period of time user popularity of the media content can include tracking a number of downloads by users at any given time within the period of time, tracking a number of page views by users at any given time within the period of time, and/or tracking a length of time listened to or viewed by users at any given time within the period of time.

In embodiments, the value of media content can be determined by how the media content is engaged as a fraction of all media engagement events in a particular period of time. Each engagement can be equated to a point.

Recommending media content can include matching media content of a genre associated with the first user with media content of the genre associated with the second user, and recommending matched media content of the genre associated with the first user to the second user.

In still another aspect, the invention features a method including, in a server system, tracking popularity of songs over a period of time and tracking songs that a user plays over time. The method catalogs the tracked songs into a user portfolio of played songs along with other information, values the tracked songs, and measures a difference in value of played songs in the portfolio of the user at a first point in time and at a subsequent point in time.

In embodiments, valuing can include monitoring how often the tracked songs are played by the user and a popularity of the tracked songs as a fraction of a total number of plays by a number of users. Each song play can be assigned a point. Measuring can include assigning points to each play at the first point in time, and assigning points to each play at the subsequent point in time proportional to a song's change in popularity.

The invention can be implemented to realize one or more of the following advantages.

A method measures a user's position on an adoption life cycle curve, suggests media content to the user based on the user's position on the curve relative to other users. The method can use adoption time as a filter or adjunct to conventional recommendation systems.

The value of a song can be based on how often it is played, as a fraction of all the play events.

A method enables identifying new content (e.g., music or movie) associated with consumers that are early adopters and uses these early adopters to make recommendations for other less adventuresome listeners, or to provide content-consumer intelligence.

A method captures the dynamics of media consumption.

A method recommends content, such as music, to users based on where they are on the adoption life cycle.

A method places users at the proper position on the adoption life cycle curve and identifies the content (e.g., songs) that is popular with one group of adoptees so the content can be recommended to those that are less adventuresome.

A method helps users find new content (e.g., music to listen to) in a very dynamic content environment.

A method makes recommendations based on early adoption (and other temporal periods).

A method can predict hits based on who is listening to a song early in its adoption life cycle.

A method can provide intelligence to media producers based on a portfolio model and other predictions of early adopters of what songs are going to be most popular.

One implementation of the invention provides all of the above advantages.

Other features and advantages of the disclosure are apparent from the following description, and from the claims.

BRIEF DESCRIPTION OF THE DRAWINGS

FIG. 6 is a flow diagram.
Like reference numbers and designations in the various drawings indicate like elements.

DETAILED DESCRIPTION

Figure 1:
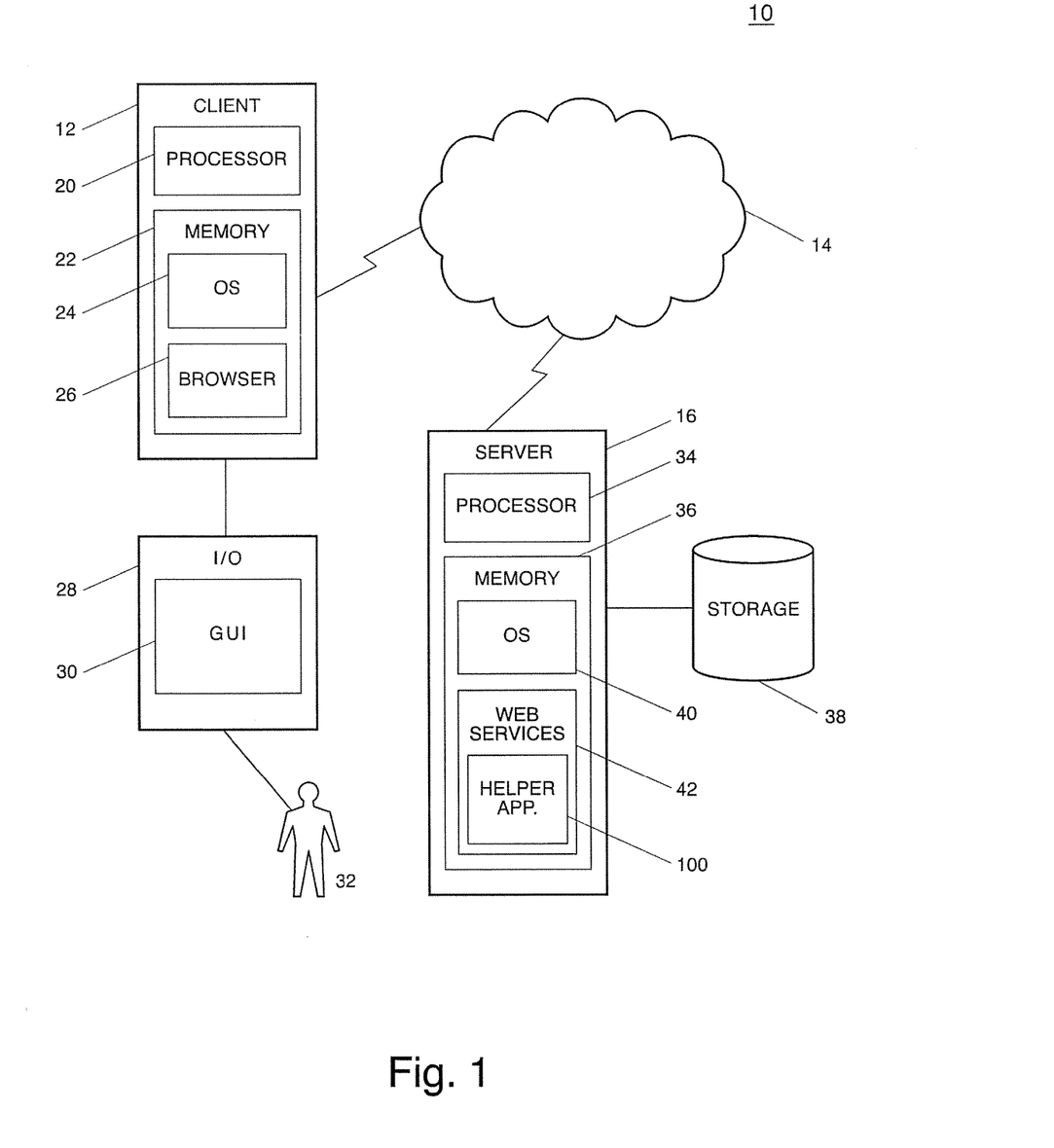
FIG. 1 is a block diagram of an exemplary network.

As shown in FIG. 1, an exemplary network 10, shown here as a client-server network, includes a client 12 connected to a global network of interconnected computers 14. In one particular example, the network 14 is the Internet. In other examples, the network 14 can be any network capable of transmitting data, such as, for example, an intranet, Local Area Network (LAN), Wide Area Network (WAN), or other network using point-to-point protocols (PPP), Wireless Application Protocols (WAP), and so forth. A server 16 is linked to the client 12 through the network 14.

The client 12 can include a processor 20 and memory 22. Memory 22 includes an operating system (OS) 24, such as Linux or Windows®, and a web browser process 26. With web browser 26, such as Firefox®, Opera®, or Netscape Navigator®, a user can view web pages that may contain text, images, and/or other multimedia, and navigate between web pages using hyperlinks.

The client 12 includes an input/output device 28 for display of a graphical user interface (GUI) 30, generated by web browser process 26, for display to a user 32.

The server 16 can include a processor 34, memory 36 and storage device 38. Memory 36 includes an OS 40, such as Linux or Windows®, and web services 42. Web services 42 include a helper application 100, described below. Example web services 42 include web-based music services, such as Yahoo!® Music™ Unlimited, web-based email services, such as Yahoo!® email, web-based toolbar services, such as Yahoo!® toolbar, and web-based instant messaging services, such as Yahoo!® Messenger, The user 32 can subscribe to one or more of web services 42 through web browser 26. For example, if the user 32 subscribes to Yahoo!® Music™ Unlimited, the user 32 can play and save full-length songs, select from thousands of play lists, access new music releases, enjoy commercial-free radio stations twenty-four hours a day, generate and share music with friends, access music and play lists from other users, pay per song to keep the music, and so forth. The web service 42 maintains a database of users, along with their profiles, a store of music, tracking information (e.g., music downloads, plays, and so forth), and a preference indication of how adventurous the user is feeling with respect to being exposed to new content. For example, a preference indicator of "1" may reflect a desire to be conservative while a preference indicator of "10" may reflect a desire to be extremely adventurous. Other indicators, numeric or non-numeric, can also be used. A user's preference indicator can be user-selectable so that the user can alter the preference indicator when desired.

Subscription to one of the web services 42, such as Yahoo!® Music™ Unlimited, provides content recommendations to the user 32 via the helper application 100. The helper application 100 recommends content, e.g., music, for users based on where users are positioned on a bell curve or Gaussian curve referred to herein as an adoption life cycle curve.

As any new content becomes available, helper application 100 within the web service 42 such as Yahoo!® Music™ Unlimited, tracks its popularity over time. Determining popularity is an on-going process and can be measured by the helper application 100 using one or more functions, such as the number of downloads by users at any given time, tracked over a period of time, or the number of page views, or the length of time listened to or viewed by users. This data is maintained and routinely tracked and updated by the web service 42. The information can be stored on the server 16 and used to position users of the web service 42 with respect to each other and when in time they adopt particular content. Analyzing content in this manner captures the dynamics of media consumption. Most products go through a life cycle based when consumers adopt to a new idea, through a peak of popularity and then dwindling popularity. A bell curve (i.e., adoption life cycle curve), here depicted as a mathematical or graphical representation of the popularity of music (e.g., a single song, a genre, a band, an album, and so forth), in one instance, can be plotted against time on one axis, and used to understand who the early adopters are. An early adopter interests can be used to generate recommendations to users who are later adopters, i.e., less adventuresome. Placing users on the adoption life cycle curve represents and identifies how some users adopt content earlier than others, while other users adopt content at a time in which the content has grown to a peak of popularity, or subsequent to its peak of popularity.

Figure 2:
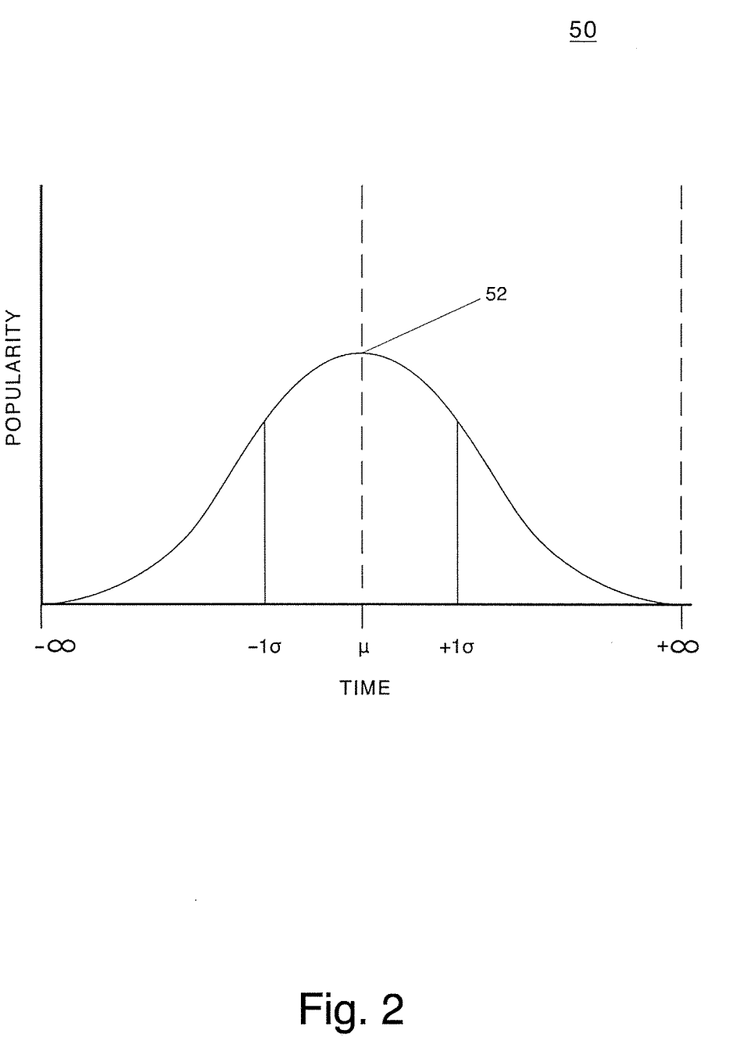
FIG. 2 is an exemplary adoption life cycle curve.

As shown in FIG. 2, an exemplary adoption life cycle curve 50 uses music as an example. In this example, the adoption life cycle curve 50 is depicted as Gaussian curve of the popularity of music (e.g., a single song, a genre, a band, an album, and so forth) plotted on one axis, against time on another axis. In general, a Gaussian distribution, also called a normal distribution, is an important family of continuous probability distributions, applicable in many fields. Each member of the family may be defined by two parameters, location and scale: the mean ("average") and standard deviation ("variability"), respectively. The standard normal distribution is the normal distribution with a mean of zero and a variance of one.

In other examples, the adoption life cycle curve 50 can be applied to other web content, such as movies, restaurants, videos, images, media item portions for use in mash-ups or mixes, blogs, printed media, vacation destinations, and any other type of content that may be experienced by a user in some form, and in connection therewith a user's positive preference for the content or item can be derived or ascertained. Here the mean 52 of the adoption life cycle curve 50 represents a peak of the music's usage or popularity.

Users can be categorized and placed on the adoption life cycle curve 50, based upon how early (or late) in time the user is determined to express that they like the thing represented by the curve 50 (a positive preference). The degree to which a user expresses a preference can also serve as a variable or threshold in plotting the adoption life cycle curve 50, for example the curve only represents users that rated an item of content with three out of five stars, or a rating of seventy out of one hundred, on a preference scale that may be presented in a user interface (UI) of the web service 42. Or, the preference may be derived from user behavior, for example, when a user plays a song five times in a week, even if that user did not affirmatively rate the song through the UI.

More particularly, if the current user's preference indicator is low, the helper application 100 identifies other users that are close to and/or just ahead of the current user on the adoption life cycle curve 50. In the exemplary adoption life cycle curve 50, points along the adoption life cycle curve 50 can be assigned a numeric representing where a user is positioned with respect to the adoption of content. In the example, a peak of popularity in time is assigned a numeric value of 1.0, a start before any popularity is assigned a numeric value of 0.0 and an end of popularity is assigned a numeric value of 2.0. Values less than 1 represent users who adopted particular content prior to its peak of popularity, while values greater than 1 represent users who adopted the particular content after the peak. For example, a user assigned a numeric of 0.3 on the adoption life cycle curve 50 is considered to be an individual who adopts to particular content earlier than a user assigned a numeric value of 0.5, i.e., 0.3<0.5. A user assigned a numeric value of 0.9 is considered to be an individual who adopts particular content earlier than a user assigned a numeric value of 1.5, i.e., 0.9<1.5. This numeric assignment scheme can be used in conjunction with a particular user's preference indication to recommend content identified as being liked by users positioned before the user on the adoption life cycle curve 50. If the current user's preference indicator is high, helper application 100 identifies users that are farther away and ahead of the current user on the adoption life cycle curve 50. For example, if the current user is placed at 0.8 on the adoption life cycle curve 50 and the current user's preference indication is 1, identification engine 104 identifies content associated with users placed at 0.7 on the adoption life cycle curve 50. If the current user is placed at 0.7 on the adoption life cycle curve 50 and the current user's preference indicator is 5, identification engine 104 identifies content associated with users placed at 0.4 on the adoption life cycle curve 50.

In one example, content, such as the songs that a user listens to over time, are tracked and cataloged into a user portfolio of content, along with other information, using helper application 100. The helper application 100 measures a difference in a user's content portfolio at a first point in time and again at a subsequent point in time.

Using songs as an example, songs can be valued. The helper application 100 uses the user portfolio to capture a change in popularity of the songs the user listens to today, based on how often they are played today, and at a point in the future. If the songs the user is listening to are growing in popularity, then the user's portfolio value will go up.

For example, the value of a song can be based on how often it is played, as a fraction of all the play events. If each play is equated to a point and if there are one million play events for all songs over a selected period of time, then each point is numerically equal to one millionth and the sum of all points is equal to one.

At an initial point in time, the helper application 100 counts the number of times each web service user plays a song and gives each user a point for each play. For some selected time in the future, each song gets points proportional to its change in popularity. For example, if the song is played 0.1% of the time today, and 0.2% of the time after one month, then this song is worth two points after a month. To calculate a future value, the helper application 100 uses the frequency of plays today and sums the value of today's plays with next month's values.

Likewise, if a song's popularity is falling, then a song worth one point today might be worth one half point in a month. That portion of the user's portfolio value will decline by 50%.

This measure generated by the helper application 100 provides an estimate of where users are in their adoption time, i.e., positive portfolio changes mean the users are earlier adopters while negative portfolio changes means the users are later adopters.

This helper application 100 does not place users on the adoption life cycle curve 50 very precisely in time, rather, it merely places users on the adoption life cycle curve 50 relative to each other. More specifically, users whose portfolio values increase over time are placed on the adoption life cycle curve 50 ahead of users whose portfolio values do not increase as much or decrease in value.

Figure 3:
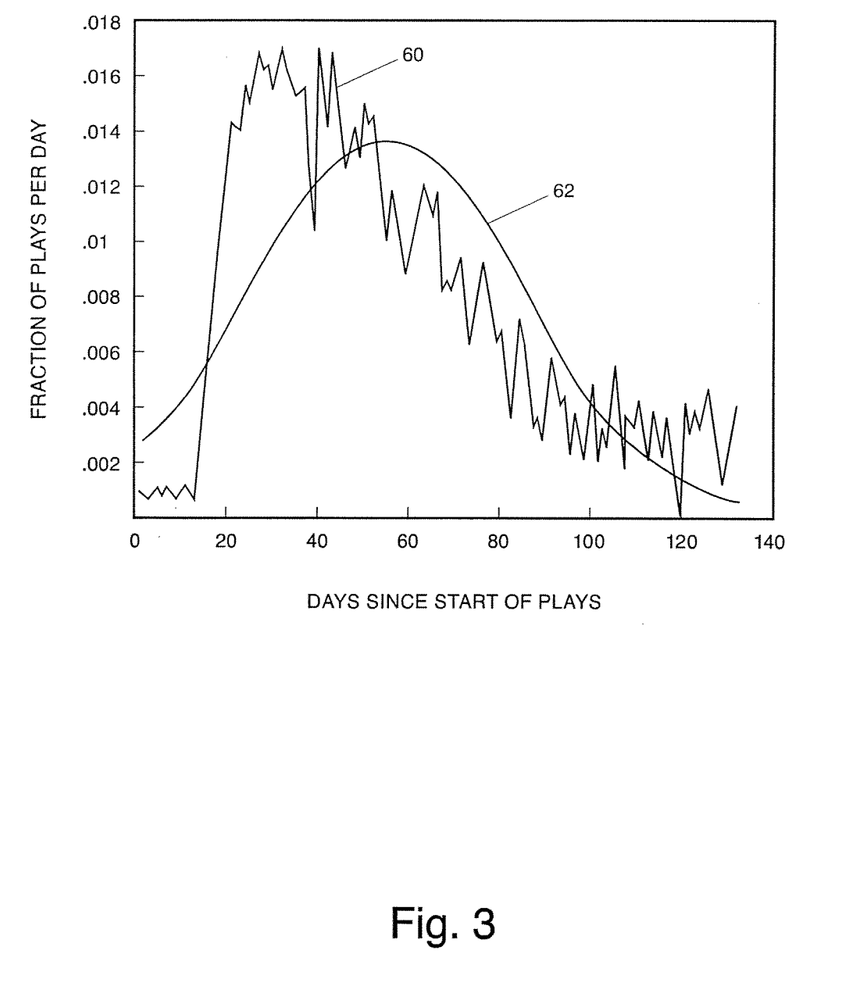
FIG. 3 is an exemplary histogram and adoption life cycle curve.

As shown in FIG. 3, as an alternative to the portfolio method described above, and to more precisely place users in time, the helper application 100 can track content, such as song plays, to generate a more detailed song histogram 60. In this example, the helper application 100 measures a mean and variance of the song histogram 60 and then fits a Gaussian curve 62 (i.e., an adoption life cycle curve) to the data. The helper application 100 re-labels the time axis (i.e., x-axis) to normalize everything. For example, the mean of the Gaussian curve 60 becomes time 0. Plus one and minus one standard deviations out are labeled as plus one and minus one. This gives a normalized time scale in terms of the standard deviations from the mean. The helper application 100 can re-label the time of each user's play events in terms of their standardized times. A user who is a very early adopter will have a mean play time that is significantly less than zero. A user that is a very late adopter will be much higher than one. Thus, users can be placed on the curve 60 as they adopt content in time relative to popularity and to each other more precisely. This measure of adoption time for one song can be average over all songs a user plays during a given period, for example a day, to get a measure of that user's position on the music-adoption scale.

Both methods described above provide a way to characterize an adoption time of a user.

A user's position on the adoption life cycle curve 50 is stored by the web service 42 and may change over time. Accordingly, positions of users on the adoption life cycle curve 50 can be updated periodically, such as, for example, daily, weekly or monthly.

As described above, the helper application 100 identifies the content, e.g., songs, often categorized by genre, which are popular with a group of adoptees. For a particular user, the helper application 100 identifies other users in the database of users stored in the server storage device 38 who are positioned on the adoption life cycle curve 50 just ahead of the particular user, and in some examples, using the current user's preference indicator of how adventurous the user is feeling with respect to being exposed to new content, which the user may have included in their profile, or which may be derived by the web service 42 on observed user behavior (e.g., a user is consistently identified as an early adopter, so the web service 42 assumes they are a adventurous and more open to new content).

If a user is feeling adventuresome, the helper application 100 matches the tastes of the current user with the tastes of the earlier users. For example, if the current user likes country music, then helper application 100 can be designed so that it loads only identified users with country music tastes. Helper application 100 then recommends music associated with the identified users of similar musical tastes that are more adventurous than the current user and likewise, if the user is wanting safe musical choices.

More generally, once a user's position on the adoption life cycle curve 50 is identified, helper application 100 finds other users with approximately similar tastes. For somebody at any position T on the adoption life cycle curve 50, helper application 100 recommends songs of users at T−Δ, where Δ is a variable that reflects how adventuresome (e.g. open to new or unexperienced media) the user has been determined to be based on observed behavior, derived behavior, and/or by self-identification via preference input by the user.

The helper application 100 can be used to enable recommendations based on early adoption (and other temporal periods), predict hits based on who is listening to a song early in its life cycle, (for example where a user or group of users has shown over time that many of the songs they adopt early become "hits" or very popular) and provide intelligence to media producers, based on the portfolio model described above and other predictions of early adopters, of what songs are going to be most popular. Such information can be sold, for example, as one of myriad ways to monetize the features described herein. For other items of content intelligence gathered could be sold to advertisers or marketing companies or consultants, or be used for competitive analysis, as just a few examples.

While examples above used songs as the exemplified media, any media type can be contemplated as coming within the scope of the disclosure, including, by way of non-limiting example, video, images, ring tones, movies, podcasts, blog posts, media item portions for use in mash-ups, or any type of consumable media that may be experienced by a user by some electronic means.

Figure 4:
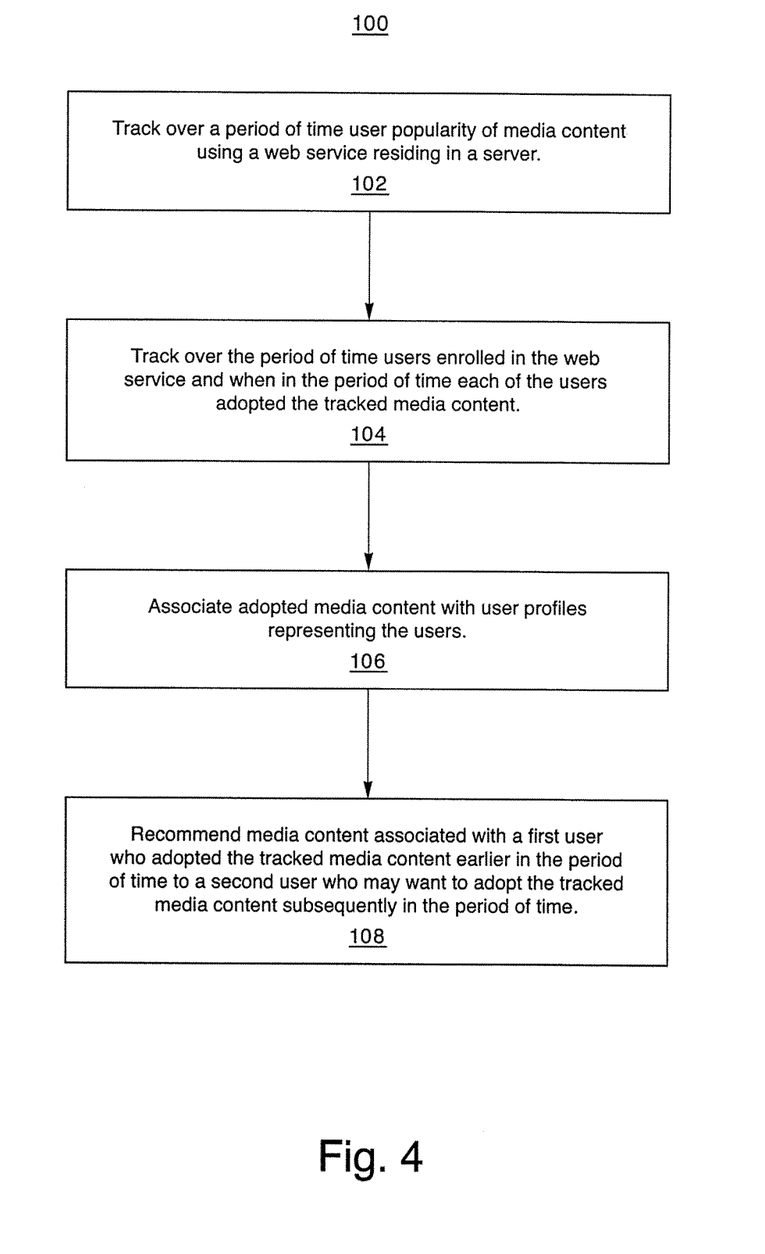
FIG. 4 is a flow diagram.

As shown on FIG. 4, helper application 100 includes tracking (102) over a period of time user popularity of media content using a web service residing in a server. The popularity and period of time represents a life cycle of each of the media content. Tracking (102) over the period of time user popularity of the media content can include tracking a number of downloads by users at any given time within the period of time, tracking a number of page views by users at any given time within the period of time, and/or tracking a length of time listened to or viewed by users at any given time within the period of time.

Helper application 100 tracks (104) over the period of time users enrolled in the web service and when in the period of time each of the users adopted the tracked media content. Tracking (104) can include measuring a mean and a variance of a histogram of song plays, fitting the histogram to a Gaussian curve, and re-labeling a time axis of the histogram to normalize. The mean of the Gaussian curve becomes time 0, plus one and minus one standard deviations out labeled as plus one and minus one.

Helper application 100 associates (106) adopted media content with user profiles representing the users. Associating (106) adopted media content with user profiles representing the users can include identifying genres of the user's adopted media content, and storing the adopted media content and the identified media content in the user's web service profile. Each of the user profiles can include a user-selectable preference indicator that indicates how adventurous the user is feeling with respect to being exposed to new content.

Helper application 100 recommends (108) media content associated with a first user who adopted the tracked media content earlier in the period of time to a second user who may want to adopt the tracked media content subsequently in the period of time. Recommending (108) media content can include matching media content of a genre associated with the first user with media content of the genre associated with the second user, and recommending matched media content of the genre associated with the first user to the second user.

Figure 5:
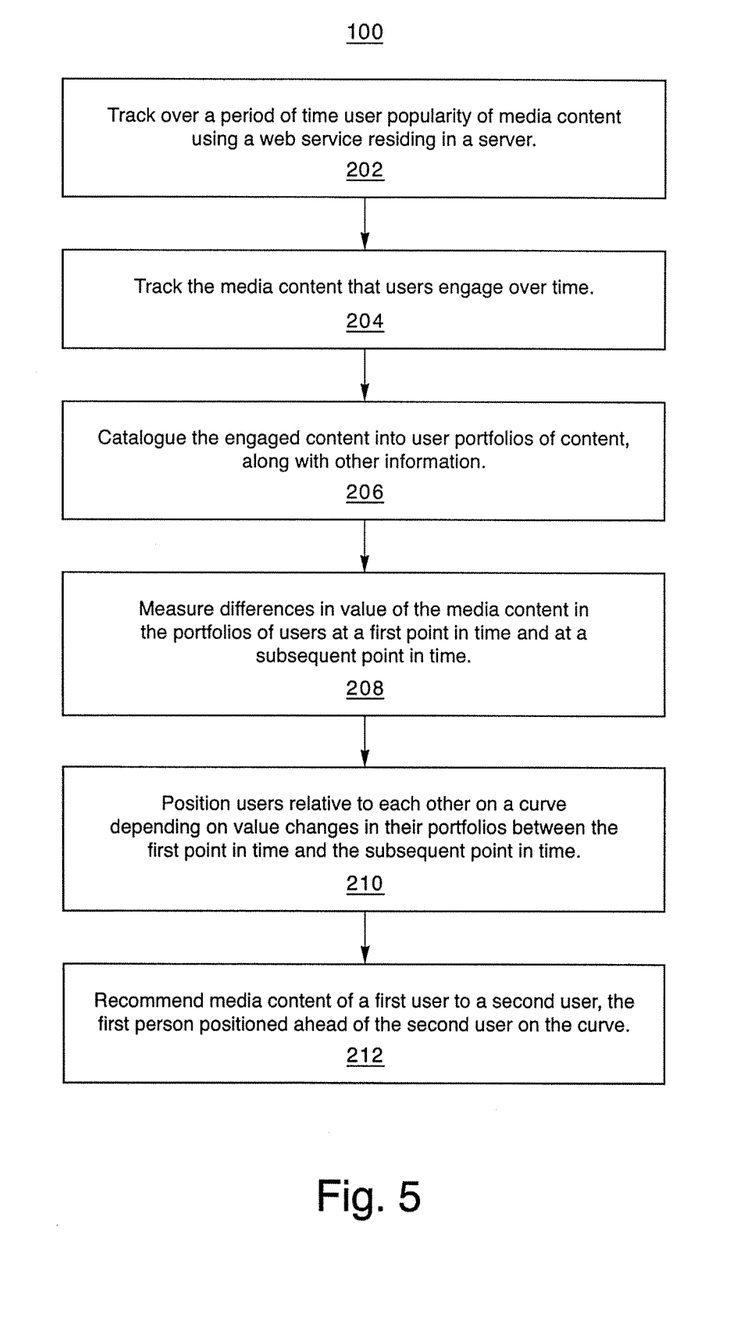
FIG. 5 is a flow diagram.

As shown in FIG. 5, in a second example, helper application 100 includes tracking (202) over a period of time user popularity of media content using a web service residing in a server. The popularity and period of time represents a life cycle of each of the media content. Tracking (202) over the period of time user popularity of the media content can include tracking a number of downloads by users at any given time within the period of time, tracking a number of page views by users at any given time within the period of time, and/or tracking a length of time listened to or viewed by users at any given time within the period of time.

Helper application 100 tracks (204) the media content that users engage over time.

Helper application 100 catalogues (206) the engaged content into user portfolios of content, along with other information.

Helper application 100 measures (208) differences in value of the media content in the portfolios of users at a first point in time and at a subsequent point in time. The value of media content can be determined by how the media content is engaged as a fraction of all media engagement events. Each engagement can be equated to a point.

Helper application 100 positions (210) users relative to each other on a curve depending on value changes in their portfolios between the first point in time and the subsequent point in time.

Helper application 100 recommends (212) media content of a first user to a second user, the first person positioned ahead of the second user on the curve. Recommending (212) media content can include matching media content of a genre associated with the first user with media content of the genre associated with the second user, and recommending matched media content of the genre associated with the first user to the second user.

Figure 6:
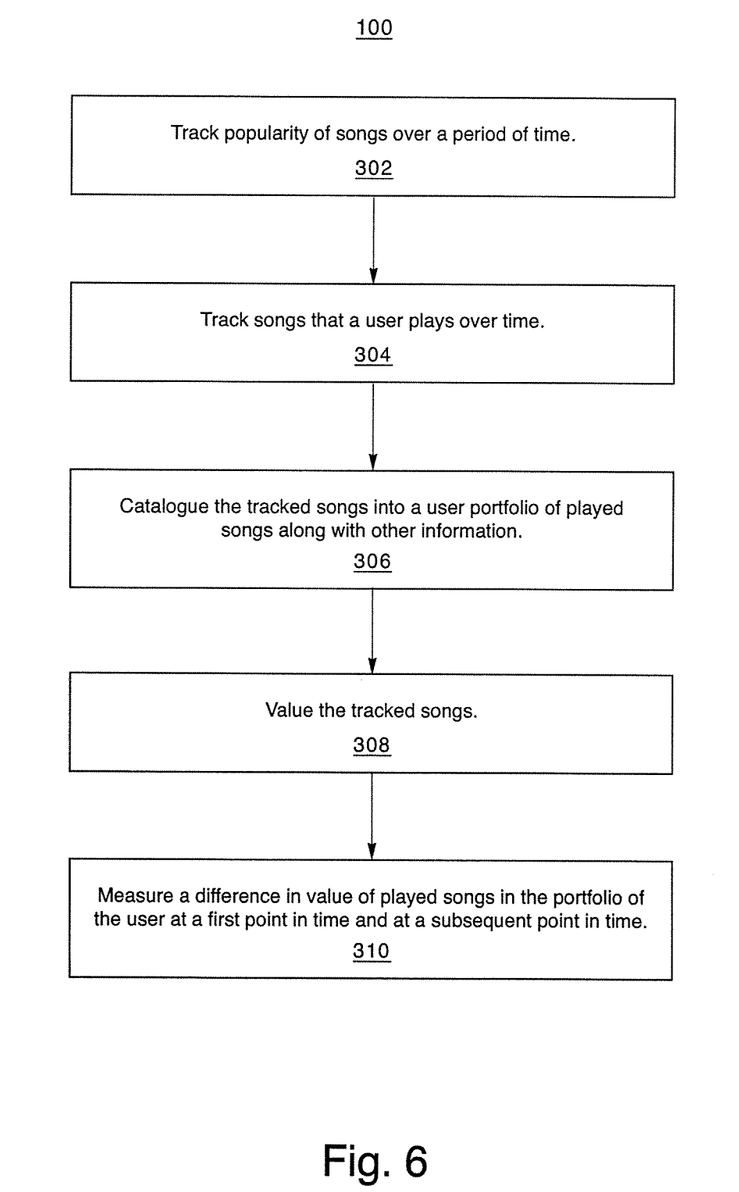

As shown in FIG. 6, in a third example, helper application 100 includes tracking (302) popularity of songs over a period of time.

Helper application 100 tracks (304) songs that a user plays over time.

Helper application 100 catalogues (306) the tracked songs into a user portfolio of played songs along with other information.

Helper application 100 values (308) the tracked songs. Valuing (308) can include monitoring how often the tracked songs are played by the user and a popularity of the tracked songs as a fraction of a total number of plays by users. Each song play can be assigned a point.

Helper application 100 measures (310) a difference in value of played songs in the portfolio of the user at a first point in time and at a subsequent point in time. Measuring (310) can include assigning points to each play at the first point in time, and assigning points to each play at the subsequent point in time proportional to a song's change in popularity.

Embodiments of the disclosure can be implemented in digital electronic circuitry, or in computer hardware, firmware, software, or in combinations of them. Embodiments of the disclosure can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the disclosure can be performed by one or more programmable processors executing a computer program to perform functions of the disclosure by operating on input data and generating output. Method steps can also be performed by, and apparatus of the disclosure can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the disclosure, which is defined by the scope of the appended claims. Other embodiments are within the scope of the following claims.

What is claimed is:

1. A method comprising:
   in a server system comprising a server that includes at least one processor, tracking, by the server, popularity of songs over a period of time;
   tracking, by the server, songs that a user plays over time;
   cataloging, by the server, the tracked Songs into a user portfolio of played songs along with other information;
   valuing, by the server, the tracked songs based on each tracked song's rendering activity;
   measuring, by the server, a difference in value of played songs in the portfolio of the user at a first point in time and at a subsequent point in time;
   matching, by the server, media content of a genre associated, with the user with media content of a genre associated with a second user based on said measuring; and
   recommending, by the server, matched media content to the second user.

2. The method of claim 1 wherein each song play is assigned a point.

3. The method of claim 2 wherein said measuring comprises:
   assigning points to each play at the first point in time; and
   assigning points to each play at the subsequent point in time proportional to a song's change in popularity.

4. A computer-readable storage medium tangibly encoded with a computer program product comprising computer-executable instructions, that when executed by a server computing device, perform a method comprising:
   tracking popularity of songs over a period of time;
   tracking songs that a user plays over time;
   cataloging the tracked songs into a user portfolio of played songs along with other information;
   valuing the tracked songs based on each tracked song's rendering activity;
   measuring a difference in value of played songs in the portfolio of the user at a first point in time and at a subsequent point in time;
   matching media content of a genre associated with the user with media content of a genre associated with a second user based on said measuring; and
   recommending matched media content to the second user.

5. The computer-readable storage medium of claim 4 wherein each song play is assigned a point.

6. The computer-readable storage medium of claim 5 wherein said measuring comprises:
   assigning points to each play at the first point in time; and
   assigning points to each play at the subsequent point in time proportional to a song's change in popularity.

* * * * *